United States Patent [19]

Summers et al.

[11] 4,152,301

[45] May 1, 1979

[54] CATALYST FOR AUTOMOTIVE EMISSION CONTROL AND METHOD FOR MAKING SAME

[75] Inventors: Jack C. Summers, Rochester; Louis Hegedus, Grosse Pointe Woods, both of Mich.

[73] Assignee: General Motors Corporation, Detroit, Mich.

[21] Appl. No.: 913,583

[22] Filed: Jun. 8, 1978

Related U.S. Application Data

[63] Continuation-in-part of Ser. No. 814,982, Jul. 15, 1977, abandoned.

[51] Int. Cl.² .................... B01J 21/04; B01J 23/42; B01J 23/44
[52] U.S. Cl. .................... 252/466 PT; 423/213.5
[58] Field of Search ............... 252/466 PT; 423/213.5

[56] References Cited

U.S. PATENT DOCUMENTS 3,259,589 7/1966 Michalko .................... 252/466 B
3,360,330 12/1967 Hoekstra .................... 252/465 X Primary Examiner—W. J. Shine
Attorney, Agent, or Firm—Sidney Carter

[57] ABSTRACT

A layered catalyst having significantly improved performance characteristics including greater resistance to poisoning and sintering in automotive exhaust comprising an alumina support having a first layer of platinum positioned at the support surface and penetrating the body thereof to a desired depth with a second layer of at least one of the catalytically active materials selected from the group consisting of rhodium and palladium, the second layer being adjacent to the first layer and penetrating the body of the support for a depth beyond that of the first layer, maximum concentration of platinum being in the first layer together with minimum concentration of the catalytically active materials, and minimum concentration of platinum with maximum concentration of the catalytically active materials being in the second layer. The catalyst is prepared by impregnation with separate solutions of the catalyst materials, acid treatment of the active sites of the support being used to block the sites from the surface through the desired depth of the platinum layer.

12 Claims, 9 Drawing Figures

CATALYST FOR AUTOMOTIVE EMISSION CONTROL AND METHOD FOR MAKING SAME

This application is a continuation-in-part of application Ser. No. 815,982 filed July 15, 1977, now abandoned, and relates to improved catalysts having higher catalytic performance over its required lifetime in the operating environment of automotive emissions which include precursor compounds of lead, phosphorus and sulfur, known catalyst poisons.

Numerous catalysts have been proposed and are known for oxidizing, reducing, or both oxidizing and reducing the unburned and noxious constituents in vehicle exhaust gas. Devices of both the particulate and monolith type are today in use on motor vehicles for the purpose of cleaning up the exhaust emissions to levels required by Federal and State standards. However, as standards require lower levels of unburned hydrocarbons, carbon monoxide, and $NO_x$, a greater demand is placed on the known catalysts for higher conversion efficiencies while still remaining effective over a lifespan as long as 50,000 miles and beyond without deterioration due to poisoning or sintering.

Applicants have conducted extensive theoretical and laboratory studies, with results verified by engine dynamometer testing, and have developed an improved catalyst having the desired characteristics of higher conversion efficiencies and greater resistance to poisoning and sintering. Applicants' improved catalyst is designated as a layered catalyst. As used herein, any reference to layered catalyst is intended to mean an alumina support or coating, hereinafter referred to as support, having two adjacent layers or bands in which the first or exterior layer contains Pt having good resistance to poisoning by constituents in automotive exhaust gas, the maximum concentration (the term concentration means, where Pt/Pd is used, % by weight of a catalyst material to the total weight of catalyst at any depth of penetration) of Pt being at or close to the surface of the alumina support with the concentration decreasing with increasing penetration into the support, the first layer also containing other catalytically active materials than Pt having greater susceptibility to poisoning than Pt, e.g., Pd and Rh, the minimum concentration of such other materials in said first layer being at or close to the surface of the alumina support with the concentration thereof increasing with increasing penetration into the support, and, where Pd is used, to a depth at which the concentration of Pd equals the concentration of Pt, this depth being the boundary between the first and second layers. Pd concentration further increases to a maximum concentration at a depth of penetration inwardly of the boundary and then decreases with increasing depth of penetration, the second layer extending inwardly from the boundary. Where the other catalyst material used with Pt is Rh, the term concentration as used herein means the amount of a catalyst material at any depth of penetration, the boundary between the first Pt layer and the second Rh layer being the depth at which the maximum concentration of Rh exists with the second layer extending inwardly from the boundary and containing more than one-half of the total amount of Rh on the catalyst.

Among the catalysts in the prior art are catalysts which include special physical structures. The U.S. patent to Michalko, U.S. Pat. No. 3,259,589 dated July 5, 1966 discloses a catalyst for treatment of combustible waste gas wherein an organic acid such as citric acid is used in controlled amounts with the solution of catalytically active material in order to produce a finite zone of the catalytic material either on the surface of the alumina support, or a distance below the surface, or throughout the body of the support. The patent to Hoekstra, U.S. Pat. No. 3,367,888 dated Feb. 6, 1968 discloses a catalyst having an alumina support on which a zone of platinum is deposited on the outer surface of the support "without any substantial penetration thereof," this being achieved by the use of a sulfurized carboxylic acid. The patent to Hoekstra, U.S. Pat. No. 3,360,330 dated Dec. 26, 1967 uses an organic acid such as disclosed by Michalko U.S. Pat. No. 3,259,589 to position platinum a finite distance below the surface of the support followed by impregnation with barium hydroxide and chromic acid to form a barium chromate or dichromate as a coating on the catalyst surface. U.S. Pat. No. 3,288,558 to Briggs dated Nov. 29, 1966 discloses a catalyst which is substantially completely and uniformly impregnated with a palladium-copper oxide mixture and which is further provided with a zone on the outer portion of the support representing 50% by volume of the pellet in which chromia is also deposited so as to form a three-constituent zone, chromia however also being present in the inner portion of the support though to a much lesser extent. U.S. Pat. No. 3,819,533 to Whitman et al. dated June 25, 1974 discloses a catalyst which is completely impregnated with a copper oxide-chromia mixture and having a palladium coating on the outer surface. U.S. Pat. No. 3,433,581 to Stephens et al. dated Mar. 18, 1969 discloses a catalyst similar to Briggs U.S. Pat. No. 3,288,558, in that the support is first substantially completely and uniformly impregnated with an oxide of one or more metals from the group consisting of the First Transition Series of the Periodic Table and the Lanthanide Series of Elements, followed by a coating of copper oxide.

As distinguished from the prior art, applicants have developed a layered catalyst having significantly improved conversion levels over those of catalysts currently used in automotive emissions control. In the improved catalyst the alumina support is provided with a first layer of platinum penetrating the body thereof inwardly from the surface with a second layer of catalytically active material adjacent to the inner boundary of the first layer and penetrating the body of the support inwardly from such boundary with minimum concentration overlap with the first layer in order to preserve the resistance characteristics of the catalyst to poisoning and sintering. The second layer of catalytic material is at least one of the materials selected from the group consisting of rhodium and palladium.

It is therefore an object of our invention to provide a layered catalyst for automotive exhaust gas clean-up having platinum as the outermost layer to provide improved conversion efficiency and greater resistance to poisoning. It is a further object of our invention to provide an improved catalyst having a first layer of platinum penetrating the support body from the surface thereof and having a second layer of different catalytically active material adjacent to the first layer and penetrating the support body inwardly from the inner boundary of the first layer, the second layer of catalytic material being necessary to achieve the high level of catalyst performance and having greater susceptibility to poisoning in the exhaust gas.

It is yet another object of our invention to provide a method for preparing the improved catalyst of our invention.

The foregoing and other objects of our invention will be apparent from the following description and attached drawings in which FIG. 1 shows the radial distribution of catalyst material for a bead catalyst configured in accordance with our invention with a first layer of platinum and a second layer of palladium.

Figure 1:
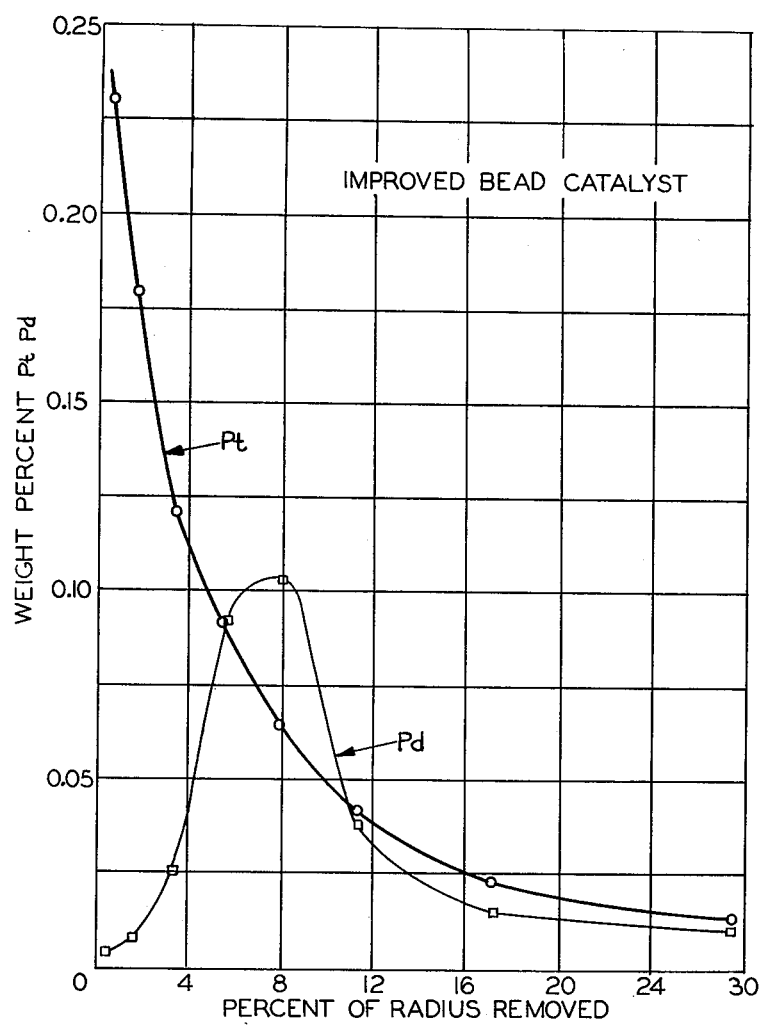

In carrying out our tests we have found that the performance and durability properties of noble metal catalysts are strongly influenced by the relative locations of the catalyst materials. More particularly, five platinum and/or palladium containing catalysts were prepared and poisoned on a dynamometer and sintered in a high temperature furnace. The results showed significant improvements in both steady state and lightoff performance when the catalyst had an outer layer of platinum and an inner adjacent layer of palladium. As discussed hereinafter, performance tests using a 3-way layered catalyst configured in the manner described herein to provide exterior platinum and interior rhodium layers for simultaneous oxidation of the hydrocarbons and carbon monoxide and reduction of the $NO_x$ content of the engine exhaust stream also showed improved performance with respect to results obtained with non-layered catalysts.

The five catalysts prepared and tested in accordance with our invention had the following configurations:
(1) Pt layer exterior with Pd layer interior, (Pt/Pd),
(2) Pd layer exterior with Pt layer interior, (Pd/Pt),
(3) Pt and Pd as a mixture, both extending inwardly with maximum concentrations of each at the surface of the support, (Pt-Pd),
(4) Pt only extending inward from the surface of the support, (Pt), and
(5) Pd only extending inward from the surface of the support (Pd).

These catalysts together with their related properties are shown in Table I below.

TABLE I

| | PROPERTIES OF THE CATALYSTS | | | | |
|---|---|---|---|---|---|
| | Pt/Pd Pt-exterior Pd-interior | Pd/Pt Pd-exterior Pt-interior | Pt-Pd Pt and Pd as mixture | Pt | Pd |
| Pt layer* | | | | | |
| begins ($\mu$) | 0 | 77 ± 18 | 0 | 0 | — |
| width ($\mu$) | 82 ± 36 | To center | >100 | 82 ± 36 | — |
| Pd layer* | | | | | |
| begins ($\mu$) | 107 ± 16 | 0 | 0 | — | 0 |
| width ($\mu$) | 37 ± 7 | 100 ± 18 | ~100 | — | 100 ± 18 |
| Pt (W %) | 0.036 | 0.038 | 0.041 | 0.036 | — |
| Pd (W %) | 0.021 | 0.018 | 0.016 | — | 0.018 |
| Metal Dispersion (%)** | | | | | |
| Fresh Catalysts | 61 | 62 | 55 | 68 | 53 |
| Sintered Catalysts | 10 | 15 | 8 | 3 | 39 |

*Values given are the mean of 10 pellets ± standard deviation, determined by the $SnCl_2$ technique.
**Effective dispersions, computed from CO chemisorption measurements, by assuming 1:1 stoichiometry for both Pt and Pd atoms.

The alumina support used to prepare the catalysts was in the form of 0.32 cm diameter spheres. It should be understood however that the support may be in the form of pellets or granules shaped other than spherical, e.g., cylindrical, such as extrudates, granular, rings, and the like, and also including monolith forms of support. That is, the support may be an all alumina body or a ceramic monolithic body with an alumina coating. The form and shape of the support is not relevant to our invention which, as described, is directed to the catalyst configuration from the standpoint of relative location of layers of different catalyst materials on the support.

As can be seen from TABLE I, the platinum and palladium loadings in weight percent, based on total catalyst weight, in each of the catalysts were selected to remain similar in order to achieve results which are fairly comparable to each other. This is likewise true with respect to the metal dispersion on the fresh catalyst. As used herein, references to metal, catalytically active materials and the like are intended to comprehend the materials both in the elemental state as well as in the oxide form when used in the context of the prepared catalyst since the materials after calcination exist probably in both states to at least some extent. The physical properties of the alumina support used are shown in TABLE II below. It is to be noted that the characteristics of the support are not relevant to the invention disclosed herein since layering will function with any of the active aluminas known as catalyst support material. However, we prefer to use the optimized types of support disclosed in our U.S. Pat. No. 4,051,073 to Hegedus et al., dated Sept. 27, 1977. Thus, our invention is not limited to the use of such optimized supports but is instead usable with supports having a surface area and pore volume, by way of example, less than that specified in our copending application.

TABLE II
| CHARACTERIZATION OF THE ALUMINA SUPPORT | |
|---|---|
| Surface Area (m$^2$/g) | 93 |
| Total Pore Volume (cm$^3$/g) | 0.723 |
| Densities (g/cm$^3$) | |
| Solid | 3.59 |
| Pellet | 0.997 |

In making the catalyst having only platinum and the catalyst having an exterior platinum layer and an interior palladium layer, an aqueous solution of H$_2$PtBr$_6$.9H$_2$O was prepared having a pH of about 2.7, this solution being used to impregnate an exterior layer of platinum on the alumina support. More particularly, 2500 cc of Al$_2$O$_3$ beads were treated by being placed in contact for three hours with a solution containing 4.96 g H$_2$PtBr$_6$.9H$_2$O dissolved in 5000 cc distilled (deionized) water. Due to its high reactivity with the alumina surface, the platinum salt used was found to give particularly sharp penetration with most of the metal occurring in a relatively shallow penetration depth, that is, the resultant platinum layer had an inner boundary at a mean depth of 82 microns with a standard deviation of ±36 microns. We have found that lower pH values for the impregnating solution caused the depth of the platinum impregnation to increase. Too high a pH causes precipitation of the Pt salt with attendant loss of impregnation control. Accordingly, the solution pH may be as high as about 5 and may be as low as necessary in order to achieve the desired depth of impregnation or layer widths, a pH range of from about 2-3 being preferred. While we have chosen to use the bromated platinum salt identified above, other water soluble salts of platinum may be used such as chloroplatinic acid, platinum chloride and the like, a spray technique of application being used.

Following impregnation with the catalytically active material, as described, the catalyst was dried and then calcined for about 4 hours at about 550° C. in air. Temperatures as low as 80° C. may be used for drying and as low as 200° C. for calcination. Calcination temperatures may be as high as desired provided the support is not sintered and dispersion of the catalyst material is not reduced. Half of the resultant catalyst was then set aside for testing as the catalyst having platinum only, the platinum being present in about 0.036 weight percent.

The other half of the platinum containing catalyst was then impregnated with an aqueous solution of palladium chloride at a pH of about 2.5. Specifically, 1250 cc of the platinum catalyst was impregnated by the incipient wetness technique using 690 cc of an aqueous solution containing 76 mg. palladium as the chloride salt and 5 g of hydrofluoric acid, the solution containing hydrofluoric acid for purposes hereinafter described as active site blocking. While we have described impregnation by incipient wetness technique, it is to be understood that any well known method for impregnation of the support may be used, e.g., dunking, spraying, tumbling. Also, the concentration or amounts of materials may be varied to obtain the desired amount of catalyst material to perform its desired function, i.e., a functional amount.

More particularly, we have found that the inorganic hydrofluoric acid causes the palladium to form a subsurface layer, such layer being referred to herein as a second or interior layer as shown in FIG. 1. It is theorized that the acid is preferentially adsorbed by the active sites in the support so that the catalytically active material used to form the second layer is forced deeper into the pellet before finding free active sites in the alumina. Accordingly, we have found that increasing the amount of hydrofluoric acid results in an increase in the depth of active sites blocked to impregnation by the catalytically active material used in forming the second layer. As shown in TABLE I, using an impregnating solution as described above results in a mean blocked depth of 107 microns, the palladium salt present being sufficient to produce a palladium layer having a mean width of 37 microns.

Consideration of the data shown in FIG. 1 shows that the average width of the exterior or first platinum layer and the beginning of the interior palladium layer, as indicated by the point of equality of concentration of the platinum and palladium, occurs at a depth of about 88 microns as determined by layer abrasion testing described below. As shown in FIG. 1, the maximum concentration of platinum occurs at the surface of the support and decreases with increasing penetration into the support, palladium being present at the surface in minimum concentration and increasing with increasing penetration. Penetration beyond the point of equality of concentration shows the palladium concentration increasing to a maximum in the second layer with decreasing concentration of the platinum. It is desired that the amount of palladium in the first layer be kept to a minimum in order that the resistance of the catalyst to both poisoning and sintering be preserved to a maximum extent, the comingling of platinum with palladium, and other catalytically active materials, apparently having a negative effect in this regard.

Figure 4:
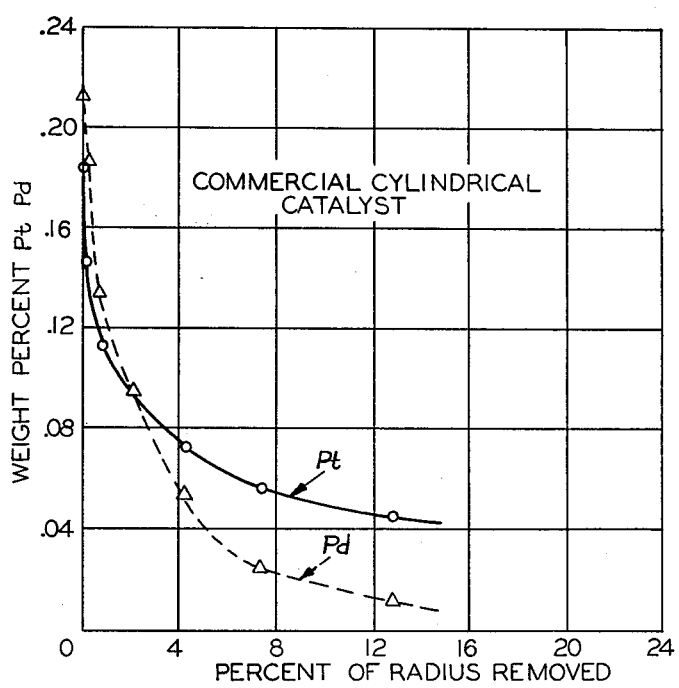
FIGS. 3 and 4 show radial distribution of catalyst material for two different commercial cylindrical catalysts configured so as to position the maximum amounts of both platinum and palladium at the surface.
Figure 3:
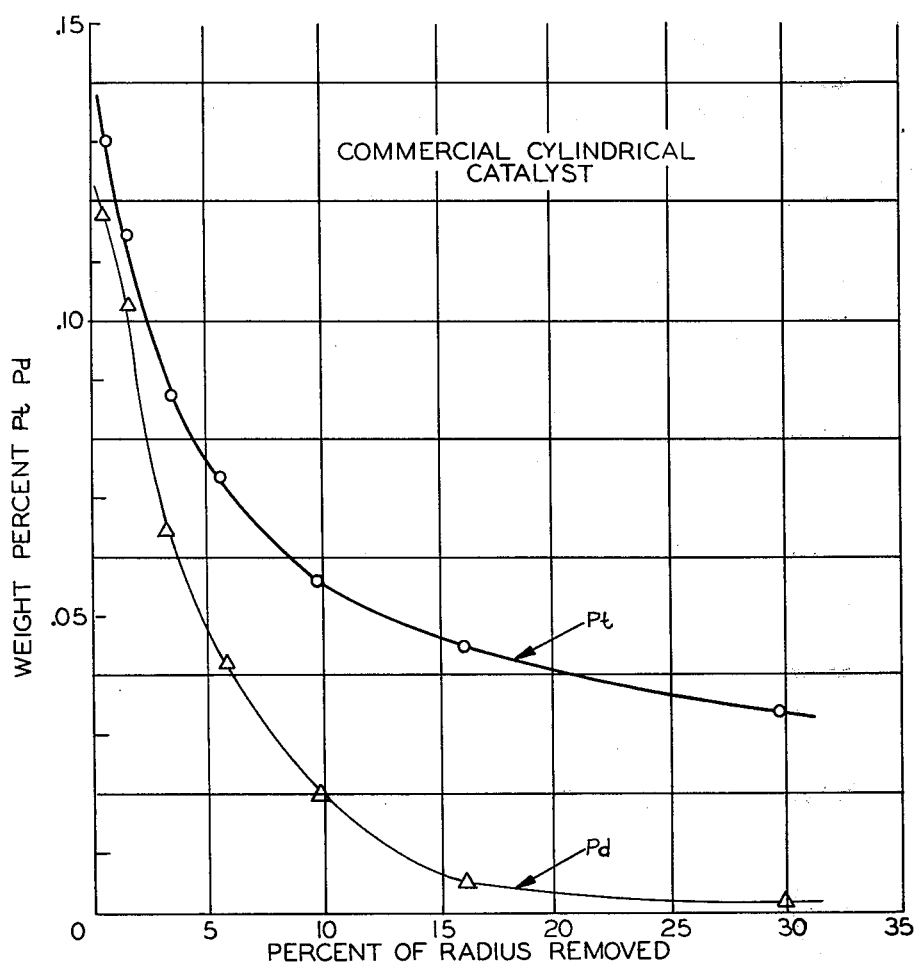
Figure 2:
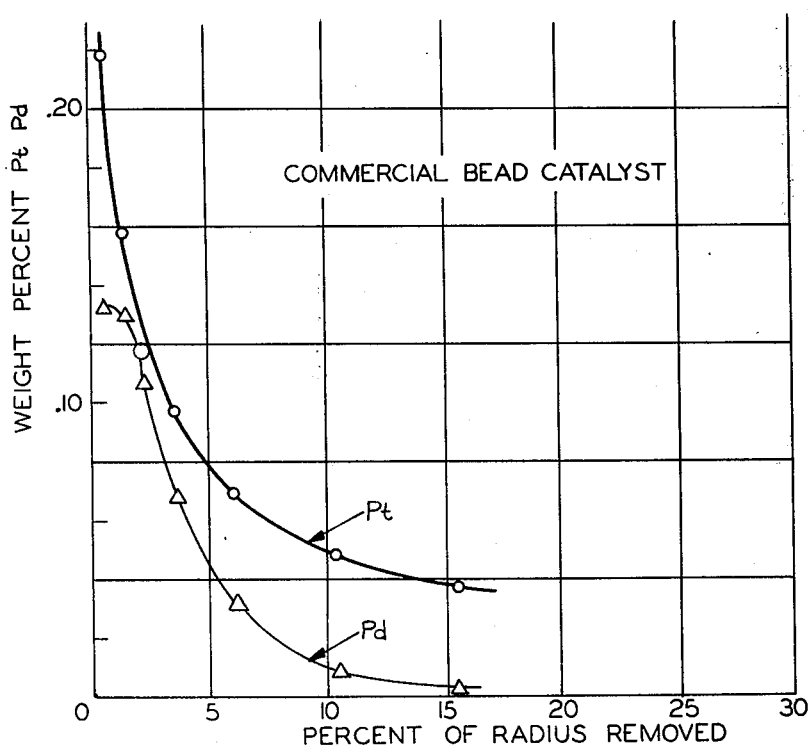
FIG. 2 shows the radial distribution of catalyst material for a commercial bead catalyst configured so as to position the maximum amounts of both platinum and palladium at the surface.

By contrast with the layered configuration shown in FIG. 1, commercial oxidation catalysts for automotive applications have no such configuration as is clearly shown in FIGS. 2, 3, and 4.

FIG. 2 shows the radical distribution of platinum and palladium on a commercially available alumina bead or spherical catalyst having a diameter of 0.134 inches. The sample contained 0.0484 weight % platinum and 0.0192 weight % palladium applied by coimpregnation with a solution containing both catalyst materials, the surface area being about 101 m$^2$/g. As is clearly shown in FIG. 2, the maximum concentration of each of platinum and palladium is at the surface of the support and both decrease with the depth of penetration. FIGS. 3 and 4 show similar distributions of platinum and palladium on cylindrical extrudates, the diameter for the FIG. 3 sample being 0.127 inches and that for the FIG. 4 sample being 0.130 inches. Impregnation was accomplished in both samples by first impregnating with platinum followed by palladium impregnation. The samples of FIGS. 3 and 4 contained, respectively, in weight %, platinum 0.0484 and 0.0385, palladium 0.0261 and 0.0162. It is therefore clearly demonstrated that the catalyst configurations for commercial oxidation catalysts is entirely different from that disclosed and claimed herein and testing has shown significantly improved performance for the layered Pt/Pd catalyst of our invention.

In performing the layer abrasion testing for the data shown in FIGS. 1 to 4, 100 grams of the catalyst pellets is placed in a covered 1 quart glass jar with sufficient chloroform to cover the surface of the pellets. The mixture is vibrated for given period of time, e.g., every 5 minutes and increasing to 10 minute intervals or longer, and the contents of the jar after each period is thoroughly washed on a screen sized to retain the pellets, the washings being analyzed for content of catalytically active materials. The percent radius removed is obtained by carefully drying the pellets to determine their loss of weight. The percent of radius removed equals $$\left[1 - \left(\frac{Wn}{Wo}\right)^{\frac{1}{3}}\right] \times 100$$

in which
  Wo = initial weight of the pellet, and
  Wn = weight of the pellet after vibration.

These test were conducted using a Tyler portable sieve shaker. It has been established that repeatable results are obtainable not only for spherical type catalysts but also for cylindrical extrudates.

The use of hydrofluoric acid as an active site blocking material is preferred since we have found it to perform as intended regardless of the character of the alumina support used. More particularly, HF as well as HCl and $H_2SO_4$ will function as a blocking agent with alumina supports having a free alkali metal content of as high as about 0.35% by weight of the support, such supports being disclosed in U.S. Pat. No. 4,051,072 to Bedford et al., dated Sept. 27, 1977 and assigned to the same assignee as our invention. However, we have found that HCl and $H_2SO_4$ will not function as blocking agents with aluminas having free alkali metal as low as about 0.05%. Also we have found that such inorganic acids as HBr and $HNO_3$ will not function to block in the different aluminas used in our tests. Similarly, we have found that such organic materials as 8-quinolinol and nitritotriacetic acid will not block in our test aluminas and that this is also the case for such salts as NaF, and the ammonium chloride, formate, acetate, oxalate, tartrate and citrate salts, these materials being known as good metal complexing salts and therefor possibly good for site blocking. We have found that organic acids such as citric acid do function with high and low free alkali metal aluminas, and accordingly, the other dibasic acids and their derivatives as disclosed by Michalko U.S. Pat. No. 3,259,589 may also be usable in achieving the desired blocking action described. In summary, blocking of the active sites on the support from the surface thereof through the first layer impregnation depth may be achieved by the selection, in accordance with out teachings, of an acid selected from the group consisting of hydrochloric, hydrofluoric, sulfuric, and citric and other dibasic acids, each acid selected having the capability of blocking the active sites in the support used and being present in an amount sufficient to block said active sites to the desired depth. As noted, HF is preferred not only for its broad applicability but also because it tends to produce a sharper band separation with minimum intermixture of catalytically active materials in the first layer and is less expensive.

It has also been found that different complexes of the catalytically active metals have different reactivity with the alumina support as shown in TABLE III, and the selection of an impregnating species having high reactivity is preferred for optimum results.

TABLE III

REACTIVITY AND PENETRATION DEPTH OF VARIOUS COMPLEXES

| | Complex | % Metal Absorbed (60 min.) | Metal* Penetration ($\mu$) |
|---|---|---|---|
| High Reactivity | $H_2PtBr_6 \cdot 9H_2O$ | 96.7 | 224 ± 16 |
| | $(NH_4)_2PdCl_4$ | 83.9 | 205 ± 46 |
| | $(NH_4)_2PdCl_6$ | 96.7 | 227 ± 35 |
| | $(NH_4)_3RhCl_6$ | 75.0 | 198 ± 39 |
| Low Reactivity | $(NH_4)_2PtCl_4$ | 32.4 | Uniform to Center |
| | $NH_4[Pt(C_2H_4)Cl_3]$ | 20.0 | Uniform to Center |
| | $(NH_4)_2Pt(NO_2)_4$ | 45.5 | Uniform to Center |
| | $(NH_4)_2PtCl_6$ | 29.6 | Uniform to Center |
| | $H_2PtCl_6 \cdot 6H_2O$ | 33.4 | Uniform to Center |
| | $K_2[Pt(CN)_4] \cdot 3H_2O$ | 22.9 | Uniform to Center |
| | $K_2Pt(SCN)$ | 22.5 | Uniform to Center |
| | $[Pt(NH_3)_4]Cl_2 \cdot H_2O$ | 23.2 | Uniform to Center |
| | $[Pd(NH_2)_4]Cl_2 \cdot H_2O$ | 36.4 | Uniform to Center |
| | $[Rh(NH_3)_5Cl]Cl_2$ | 27.0 | Uniform to Center |

*Values given are the average ± standard deviation for 10 pellets, determined by $SnCl_2$ or $Na_2S/NaOH$ staining.

While we have described our preferred method for obtaining the improved layered catalyst of our invention in terms of first impregnating the support with platinum to form the first or exterior layer followed by impregnation with a second layer solution containing the blocking acid, other methods are also possible. For example, the preferred sequence may be altered by using sequential treatment in forming the second layer, i.e., first treating the support having the first layer of platinum salt with the blocking acid, this being followed by impregnation with the second layer solution of the catalytically active material. Alternatively, instead of first applying the exterior layer of catalytically active material, the second layer of catalytically active material may be applied to the support first. As indicated this may be done either with the blocking acid combined with the impregnating salt solution or by separate sequential treatment with the blocking acid being applied prior to impregnation with the second layer solution. In either case, the impregnated support must be heated to drive off the blocking acid followed by calcining prior to impregnation with the solution of the first layer, platinum. Temperatures as high as about 550° C. for a period of up to about 4 hours may be found necessary, depending on the type of alumina support, the amount and type of blocking acid used, and the type of noble metal salts. Treatment with air, or neutral or reducing atmospheres may be used.

The amounts of catalytically active material used as shown in TABLE I are approximately those currently used on platinum-palladium oxidizing catalysts. However, it should be understood that the amount of material used forms no part of our invention and may be varied as required to achieve the desired level of performance. It should be recognized that amount variations may vary the depth of the layers of catalytically active material. The desired amount of acid required is readily determined by routine sample treatment using the desired method of our invention and analysis of layer depths. In preparing the catalysts of our invention, the total depth for the first and second layers of catalytically active material is preferred to be at least about 90 microns, the depth of the first layer, platinum, being that depth to which the poisons will penetrate over the desired lifetime of the catalyst—about 82 microns, total depth of about 119 microns, being indicated in TABLE I for Pt/Pd. It should be understood that this depth will vary depending on the concentration of poisons in the emissions gas stream and on the physical properties of the specific support.

The catalyst having both platinum and palladium as a mixture in the outer portion of the support without layering was prepared by impregnating the alumina with an aqueous solution, using deionized or distilled water as in all other examples, of both chloroplatinic acid and palladium chloride, the solution having a pH of 2.0. Specifically, 1250 cc $Al_2O_3$ was impregnated with 500 cc of a solution containing 0.3237 g platinum and 0.1290 g palladium using the incipient wetness technique. The resulting catalyst was dried and calcined in air for about 4 hours at a temperature of about 550° C. Electron microprobe studies indicated that under these conditions palladium tends to deposit closer to the exterior surface of the pellets than platinum.

The preparation of the layered catalyst having palladium on the exterior and platinum or the interior, and of catalyst having only palladium on the exterior portion of the support involved first impregnating the alumina with a $PdCl_2$ (pH=2.4) solution. At this pH a very sharp Pd profile was obtained at the outer surface of the catalyst pellets. More particularly, 2500 cc $Al_2O_3$ was impregnated with 1000 cc of an aqueous solution containing 0.2564 g palladium. After drying and calcination as above, the Pd catalyst was ready for testing. Half of the batch of Pd catalyst was used for impregnation with 500 cc of an aqueous solution containing 0.3233 g $H_2PtCl_6.9H_2O$ and 1.368 g citric acid at a pH of 2.3. Citric acid functions similarly to HF by blocking the active sites forcing the platinum into the interior of the alumina pellets. This was followed by drying and calcining as described to yield a catalyst containing an inner layer of platinum. As described above, the amounts of materials were chosen to obtain the amounts of catalytically active material as shown in TABLE I and to obtain the depth of blocking desired with minimum overlap.

In conducting the accelerated catalyst poisoning experiments shown in the attached drawings, the catalysts were poisoned in a reactor system containing four screen trays, each of approximately 250 $cm^3$ volume. The reactor was fed by the exhaust of a 5.7 liter V-8 engine. The engine was operated at 1800 RPM on an engine dynamometer, at a manifold vacuum of about 47 kPa or about 16 inches mercury. The air-fuel ratio was 15.5 for an oxidizing exhaust. The fuel contained 0.023 g Pb/liter, 0.117 g S/liter, and 0.007 g P/liter, all average values. In order to stabilize the poison emissions, the engine and exhaust system were equilibrated by operating on the poison-containing fuel for about 3 days before the first catalyst poisoning experiment.

The exhaust to the catalyst typically contained 0.29–0.34% CO, 1.16–1.20% $O_2$, and 280–320 ppm hydrocarbons. The gas hourly space velocity was about 115,000 $h^{-1}$, standard temperature and pressure. During the experiments, the catalyst bed temperature was approximately 570° C. This accelerated poisoning experiment simulated about 400 hours of real-life exposure in about 40 hours. At the end of the test, samples of the catalyst were taken from the top of each of the four reactor trays for analysis.

The noble metal penetration depths in the alumina pellets were measured by boiling the pellets in an aqueous solution of $SnCl_2$ and photographing the resulting darkened layers under a microscope. The depth of lead and phosphorus penetrations into the poisoned catalysts were determined by electron microprobe. The noble dispersions were determined by CO chemisorption. The procedures and equipment involved all are well known in the art and form no part of our invention.

Activity measurements were carried out both in-situ during the accelerated durability test in the test cell, and also in the laboratory. In the test cell we measured the hydrocarbon and carbon monoxide conversions at steady state conditions of about 570° C. and a space velocity of 115,000 $h^{-1}$ (STP). In the laboratory reactor system, CO and propylene conversions were determined as a function of temperature. The laboratory reactor consisted of a 1.9 cm I.D. stainless steel pipe which was heated electrically by a tube furnace. An inert SiC packing served as the preheater. A catalyst charge of 10 $cm^3$ and a space velocity of 85,000 $h^{-1}$ (STP) was used. The laboratory feed stream consisted of 0.3% CO, 0.025% propylene, 1.5% $O_2$ and 10% $H_2O$ in nitrogen. The programmed heating rate was 10° C./minute.

Figure 5:
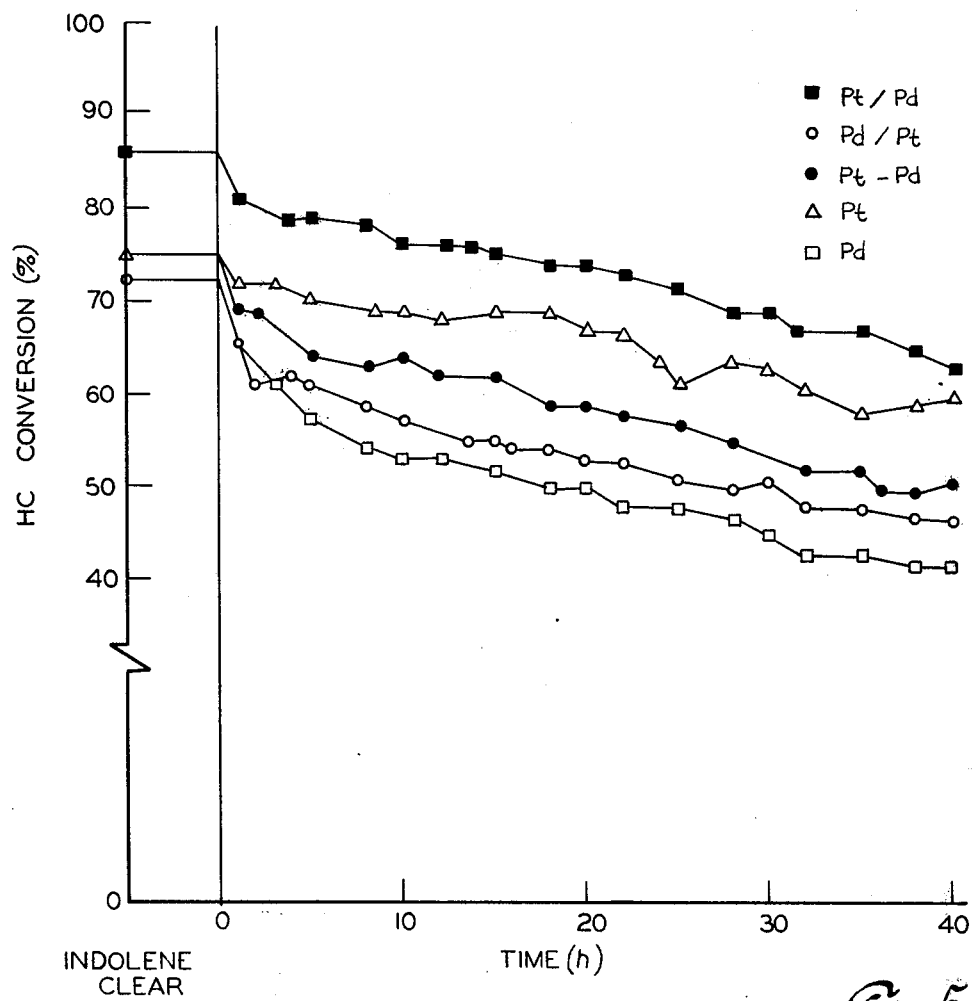
FIG. 5 shows comparative hydrocarbon conversions as a function of exposure time during accelerated testing using poison containing fuel and using variously configured catalyst.

The conversion of hydrocarbons was observed as a function of exposure time during the accelerated poisoning experiments on the dynamometer and is shown in FIG. 5.

In conducting the durability tests it was first necessary to stabilize the catalysts on an indolene clear fuel for about 15 minutes in order to obtain a measure of their initial performance. As can be seen in FIG. 5, the initial HC conversions were dependent upon the catalytically active material and upon their relative location on the support. Conversion tests similar to those of FIG. 5 were conducted for CO. For both hydrocarbons and carbon monoxide, the Pt/Pd configuration gave the best initial high temperature performance while the others were significantly lower.

Exposure of the catalysts to the poison-containing exhaust by switching to the poison-containing fuel resulted in an almost instantaneous drop in their activity as shown in FIG. 5. Earlier work has shown that this rapid drop in activity is largely associated with the halogen scavengers in the additive that was used as a source of Pb in the test fuel. The drop in activity ranged from 5 to 7% for the HC conversions at the conditions of our tests. The smallest drop was associated with Pt and the largest drop with Pd.

As shown in FIG. 5, after about the first hour of exposure to the exhaust of the poison-containing fuel, the performances of the five catalysts, in order of descending activity, are as follows:
HC: Pt/Pd, Pt, Pt-Pd, Pd/Pt and Pd.
On the basis of similar tests, the order of descending activity for CO is as follows:
CO: Pt/Pd, Pt, Pt-Pd, Pd and Pd/Pt.
The Pt/Pd configuration gives the highest HC and CO conversion for both on indolene clear fuel and also on the fuel which contains halogens. This is highly significant since it means that both the HC and CO conversions were enhanced by the same type of catalyst configuration, specifically, the layered catalyst with an exterior or first layer of platinum and an interior or second layer of palladium. As the catalysts were poisoned by P and Pb, the differences in their conversion performances became more pronounced. After 40 hours of exposure, the following order of activity was observed based on the smoothed time traces (FIG. 5):
HC: Pt/Pd, Pt, Pt-Pd, Pd/Pt, Pd.

Thus we see that the Pt/Pd configuration, in addition to its best initial performance, is also superior for poison resistance for HC and, based on similar testing, for CO conversion. As is clearly shown in FIG. 5, the catalyst configurations that contained palladium as the only catalyst material or as a first layer on the support experienced the strongest deactivation for HC, and, based on similar testing, for CO oxidation.

It is important to note the effect of having an inner layer of palladium beneath the outer layer of platinum. The higher hydrocarbon activity of the Pt/Pd catalyst is believed to be the result of the oxidation in the interior of the catalyst support of HC species that are normally difficult to oxidize. For steady CO oxidation, the inner band appears to be less important.

Figure 6:
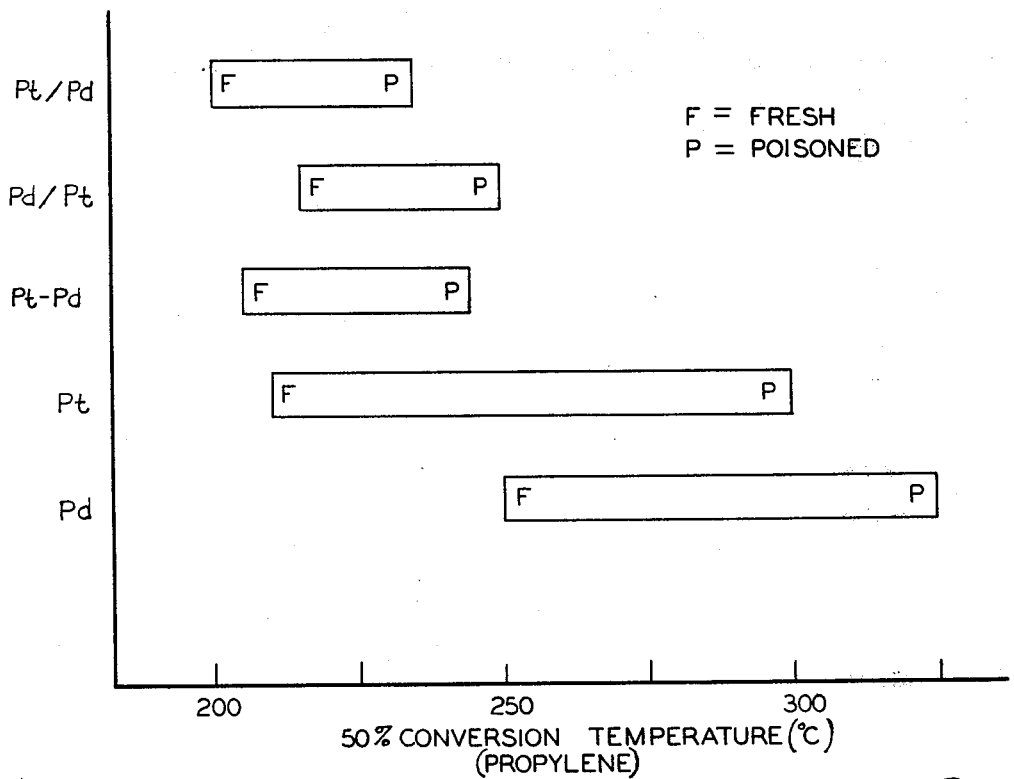
FIG. 6 shows comparative 50% propylene conversion temperatures for fresh and poisoned catalysts of various configurations.
Figure 7:
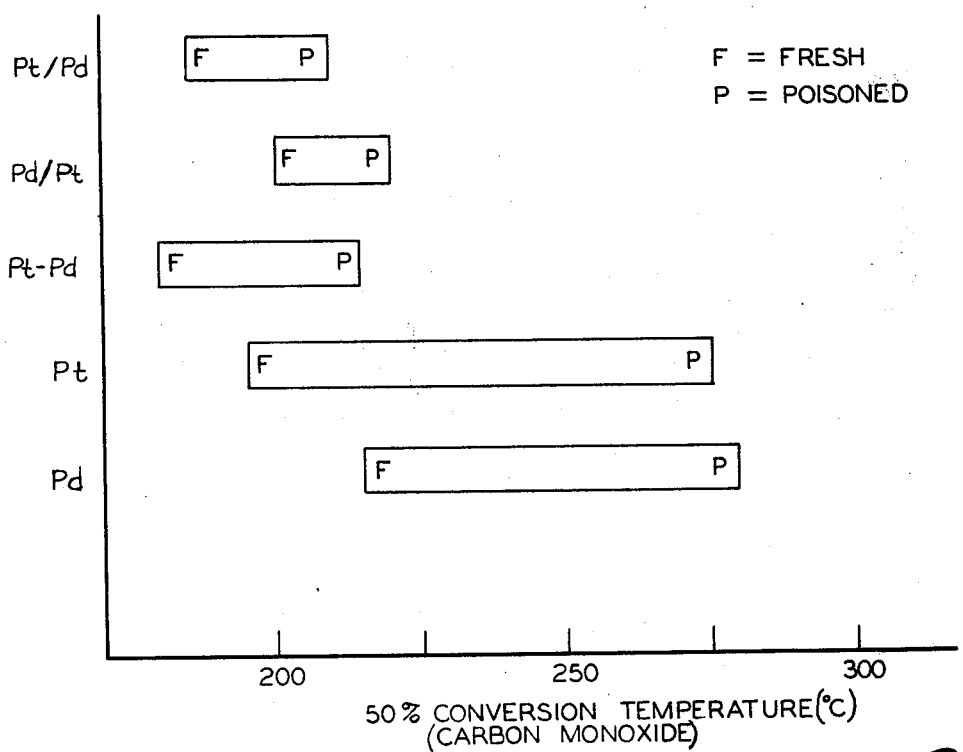
FIG. 7 shows comparative 50% carbon monoxide conversion temperatures for fresh and poisoned catalysts of various configurations.

In determining the effect of catalyst configuration on temperature-conversion performance, a temperature programmed laboratory reactor previously described was used to generate conversion - inlet temperature curve for the fresh, and poisoned catalysts. FIGS. 6 and 7 show the temperatures required for 50% conversion. As is known, the lower the temperature required, the more desirable the catalyst.

The laboratory reactor was filled with catalysts taken from the inlet tray of the test cell reactor, and thus the poison exposures of the catalysts shown in FIGS. 6 and 7 correspond to the inlet poison levels previously discussed. Since these inlet poison levels are higher than the integral average poison exposures, the equivalent "age" of the catalyst samples used in the conversion-temperature tests is more similar to an 80,000 km catalyst. For equilibration purposes, only the results of tests after the first run-up for each sample catalyst were considered.

There is only a relatively small difference in the fresh lightoff performance of the catalysts for both propylene and CO. The sequence in order of increasing temperature required for 50% conversion is:
Propylene: Pt/Pd, Pt-Pd, Pt, Pd/Pt, and Pd
CO: Pt-Pd, Pt/Pd, Pt, Pd/Pt, and Pd This sequence is similar to that observed for high temperature behavior shown in FIG. 5. The catalysts with palladium only give the poorest lightoff performance. It is noteworthy that the measure of lightoff performance of the Pd catalyst is significantly improved if Pt is added (Pd/Pt, Pt-Pd).

The lightoff performance after poisoning, is also shown in FIGS. 6 and 7. The sequence of increasing temperature required for 50% conversion is as follows:
Propylene: Pt/Pd, Pt-Pd, Pd/Pt, Pt and Pd
CO: Pt/Pd, Pt-Pd, Pd/Pt, Pt and Pd The lightoff temperatures increased by 20° to 90° C. upon aging. The differences in lightoff performance of the various poisoned catalyst configurations are very large, e.g., the lightoff temperature of Pd for propylene is about 90° C. higher than Pt/Pd. Again the Pt/Pd configuration exhibits the best performance with the coimpregnated Pt-Pd catalyst being a close second. It is also interesting to note that the deterioration in lightoff activity for propylene is somewhat greater than for CO, for all catalyst formulations.

As shown in TABLE I, after the catalysts were sintered for 7 hours at 870° C. in air, the Pt catalyst experienced the greatest loss in metal dispersion (from 68% to 3%) while the Pd catalyst lost the least (from 53% to 39%). The three Pt and Pd containing catalysts had dispersions between 8 and 15% upon sintering.

Figure 8:
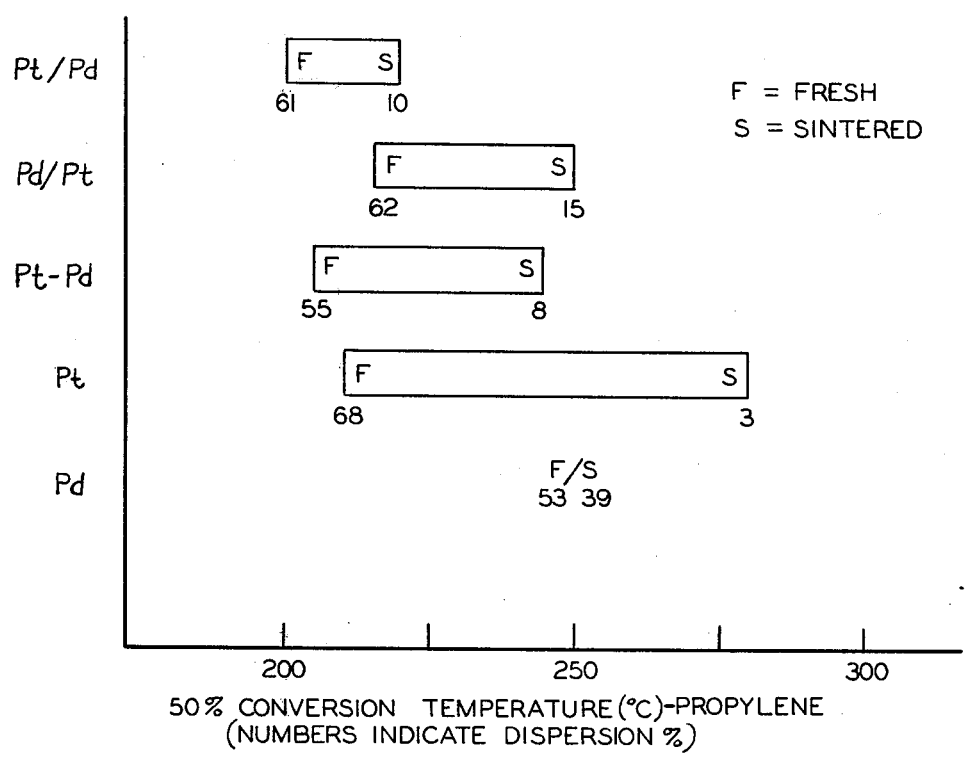
FIG. 8 shows comparative 50% propylene conversion temperatures for fresh and sintered catalysts of various configurations.
Figure 9:
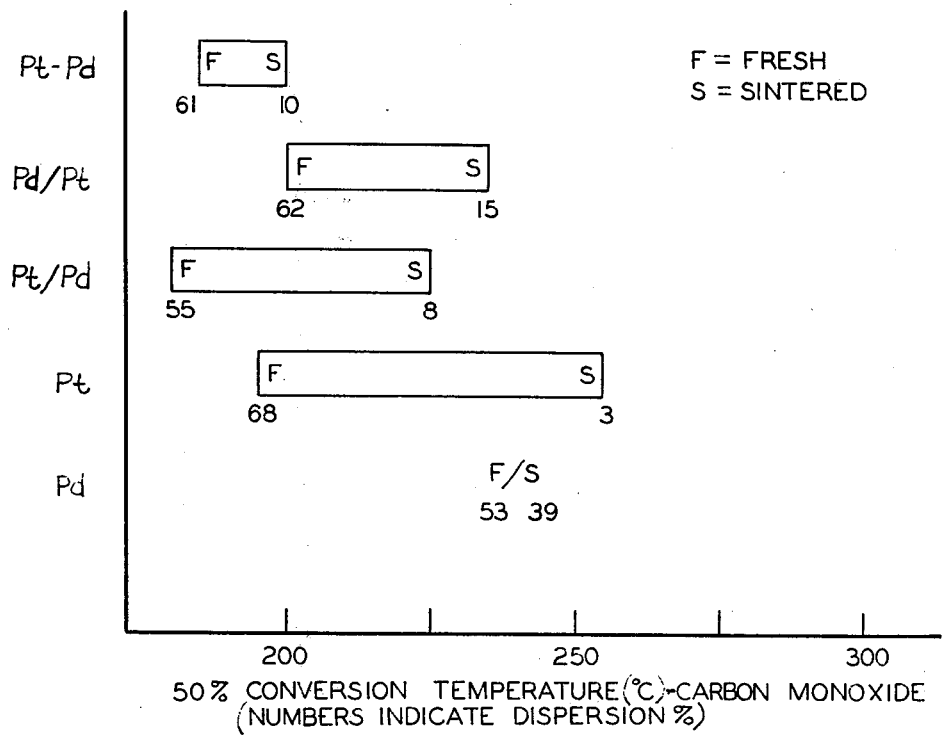
FIG. 9 shows comparative 50% carbon monoxide conversion temperatures for fresh and sintered catalysts of various configurations.

The Pd catalyst experienced no deterioration in either propylene or CO lightoff temperature upon sintering as shown in FIGS. 8 and 9. In contrast, the Pt catalyst suffered the greatest loss of lightoff activity. However, after sintering, the Pt/Pd catalyst had the highest lightoff activity for both propylene and CO. The coimpregnated Pt-Pd catalyst lost considerable lightoff activity both for propylene and CO. The sequence of the catalyst preparations, in order of increasing temperature required for 50% conversion after sintering is:
Propylene: Pt/Pd, Pt-Pd, Pd/Pt, Pd, Pt
CO: Pt/Pd, Pt-Pd, Pd/Pt, Pd, Pt.

Therefore, the best configuration to retain lightoff activity after sintering is clearly Pt/Pd, that is, platinum impregnated as an exterior layer on the support and palladium in a second layer adjacent to the inner boundary of the first platinum layer and extending inwardly therefrom.

As described in greater particularity in our copending application U.S. Ser. No. 871,706, filed Jan. 23, 1978, we have also developed a layered catalyst capable of simultaneously converting HC, CO and $NO_x$ using near stoichiometric air:fuel ratios. This catalyst is prepared in a similar manner to that described above for Pt/Pd layered catalyst and results in a catalyst having a first layer of platinum on the exterior portion of the support with a second layer of rhodium on the interior portion of the support adjacent the inner boundary of the first layer. The resulting catalyst not only has the advantage of very low levels of rhodium, i.e., about 0.002 weight percent, but also has improved poison resistance which results in improved conversion performance after aging and a lower rate of deterioration.

It has been shown that both performance, and poisoning and sintering durability of catalysts are strongly influenced by the manner in which they are impregnated by a given amount of Pt and other catalytically active materials. This was observed both for the high temperature, diffusion influenced behavior of the catalysts and also for their lightoff performance, and holds for HC and CO oxidation.

In particular, the results showed that clear improvements, both in steady state and lightoff performance, are possible if the catalyst supports are impregnated by an outer layer of platinum and an inner layer of palladium. This configuration, then, appears to be the best use of a given amount of Pt and Pd in automobile exhaust oxidation catalysts. Other embodiments of our invention may be apparent to those skilled in the art and are within the scope of our invention as set forth in the claims which follow.

The embodiments of the invention in which an exclusive property or privilege is claimed are defined as follows:

1. A method of preparing a layered catalyst having an alumina support comprising impregnating said support with a solution of a platinum to form a first layer thereon of said platinum from the surface inwardly through the body thereof to the desired depth, impregnating said support with a solution of catalytically active material selected from the group consisting of rhodium and palladium to position a second layer adjacent to said first layer, said second layer catalytically active material being at least one of the materials known to have catalytic activity for conversion of automotive exhaust gases and having a greater susceptibility to poisoning in such gases than platinum, blocking the active sites on said support from the surface thereof through said first layer impregnation depth by treating said support with an acid selected from the group consisting of hydrochloric, hydrofluoric, sulfuric and citric acids, each having the capability of blocking the active sites in said support and being present in an amount sufficient to block said active sites to the desired depth of said platinum layer, said acid being either combined with the solution of said second layer catalytically active material for coapplication to said support or applied to said support prior to impregnation with said catalytically active material solution, said support being heated to remove said acid after impregnation with said second layer solution when impregnation with platinum solution follows said acid treatment, calcining said support with said first layer thereon when impregnation with said platinum solution precedes said acid treatment, and drying and calcining said support having first and second layers, respectively, of platinum and of catalytically active material other than platinum, the resultant catalyst having improved conversion efficiency and greater resistance to poisoning and thermal degradation.

2. A method of preparing a layered catalyst having an alumina support comprising the steps of impregnating said support with an acid selected from the group consisting of hydrochloric, hydrofluoric, sulfuric and citric acids in order to block the active sites in said support from the surface through the desired depth of impregnation with platinum, the amount of acid being that which results in the desired blocked depth, impregnating said support with a solution of at least one of the materials selected from the group consisting of rhodium and palladium to form a second layer within the body of said support of catalytically active material more susceptible to poisoning in automotive exhaust gases than platinum, heating said support to drive off said acid, impregnating said support with a solution of platinum to form a first layer of catalyst material from the surface of said support inwardly to the depth desired for said first layer, and drying and calcining said impregnated catalyst support to form a catalyst having improved performance and greater resistance to poisoning and sintering, said second layer of catalytically active material being adjacent to said first layer of platinum and the amounts of said catalytically active materials being that necessary to achieve to desired catalytic activity.

3. The method in accordance with claim 2 wherein said site blocking acid is mixed with said solution forming said second layer of catalytically active material for simultaneous treatment of said support.

4. The method in accordance with claim 2 wherein said acid consists essentially of hydrofluoric acid.

5. The method in accordance with claim 3 wherein said simultaneous treatment solution consists essentially of hydrofluoric acid in an aqueous solution of palladium.

6. A method of preparing a catalyst having an alumina support, said method comprising impregnating said support with an aqueous solution of a soluble salt of platinum, platinum being resistant to poisoning by lead, phosphorous and sulfur, to deposit said platinum salt in a first layer of the desired depth, said layer starting at the outer surface of said support and penetrating into the body of said support, drying and calcining said support to decompose said salt, impregnating said support with an acid selected from the group consisting of hydrochloric, hydrofluoric, sulfuric and citric acids, the acid selected having the capability of blocking the active sites in said support, the amount of said acid being sufficient to obtain site blocking from the surface of said support through the depth of said platinum salt layer, impregnating said support with a solution of a soluble salt of at least one of the catalytically active materials selected from the group consisting of rhodium and palladium to deposit said salt in a second layer within the body of said support and adjacent to said platinum layer, said second layer catalytically active material being present in said first layer in minimum concentration to achieve the maximum benefit of the poison resistant characteristics of the platinum layer, and drying and calcining said impregnated catalyst support to form a catalyst of improved conversion efficiency and resistance to poisoning and sintering.

7. The method in accordance with claim 6 wherein said acid used for blocking the active sites of said support in hydrofluoric acid.

8. The method in accordance with claim 6 wherein co-impregnation is accomplished using an aqueous solution of palladium containing hydrofluoric acid.

9. The method in accordance with claim 6 wherein said support is impregnated with said acid prior to impregnation with said solution forming said second layer.

10. A layered catalyst consisting essentially of an alumina support having a first layer of platinum which is resistant to poisoning by lead, phosphorous and sulfur, said platinum being positioned on the surface of said support and penetrating into the body thereof, a second layer of palladium, said second layer being adjacent to said first layer and penetrating the body of said support a depth beyond that of said first layer, said palladium having minimum concentrations in said first layer to achieve the maximum benefit of the poison resistant characteristics of said platinum, the amount of said platinum and palladium in said first and second layers being sufficient to achieve the desired catalyst performance.

11. A catalyst as set forth in claim 10 wherein the depth of said platinum layer is that to which the poisons in the automotive exhaust gases will penetrate over the desired lifetime of said catalyst.

12. A catalyst as set forth in claim 11 wherein the total depth of said first and second layers is at least about 119 microns.

* * * * *

UNITED STATES PATENT AND TRADEMARK OFFICE
CERTIFICATE OF CORRECTION

PATENT NO. : 4,152,301
DATED : May 1, 1979
INVENTOR(S) : Jack C. Summers and Louis Hegedus It is certified that error appears in the above-identified patent and that said Letters Patent are hereby corrected as shown below:

Title page, in the citation of the "Related U.S. Application Data", "Continuation-in-part of Ser. No. 814,982" should read -- Continuation-in-part of Ser. No. 815,982 --.

Col. 6, line 38, "radical" should read -- radial --,

Col. 7, line 16, "test" should read -- tests --,

Col. 8, TABLE III, line 17 "(SCN)" should read -- $(SCN)_4$ --.

Col. 9, line 20, "or" should read -- on --,

Col. 10, line 2, after "noble" insert -- metal --,

Col. 11, line 14, after "steady" insert -- state --,

Col. 11, line 21, "curve" should read -- curves --,

Col. 12, line 40, after "holds" insert -- both --,

Col. 12, line 48, "catalysts" should read -- catalysis --,

Col. 13, line 48, "to" (second occurrence) should read -- the --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*